United States Patent
Ringel et al.

(10) Patent No.: US 7,450,030 B2
(45) Date of Patent: Nov. 11, 2008

(54) METHOD FOR AUTHORISATION IN A TELEMATIC CENTRE USING TWO DATABASES CONTAINING DATA CHARACTERISING THE MOTOR VEHICLE OR A MOBILE RADIO CONNECTION

(75) Inventors: Thomas Ringel, Stuttgart (DE); Martin Schilke, Esslingen (DE); Tim Schluesener, Stuttgart (DE)

(73) Assignee: Daimler AG, Stuttgart (DE)

( * ) Notice: Subject to any disclaimer, the term of this patent is extended or adjusted under 35 U.S.C. 154(b) by 93 days.

(21) Appl. No.: 10/538,665

(22) PCT Filed: Nov. 13, 2003

(86) PCT No.: PCT/EP03/12685

§ 371 (c)(1),
(2), (4) Date: Mar. 2, 2006

(87) PCT Pub. No.: WO2004/056148

PCT Pub. Date: Jul. 1, 2004

(65) Prior Publication Data

US 2006/0152387 A1 Jul. 13, 2006

(30) Foreign Application Priority Data

Dec. 13, 2002 (DE) ................. 102 58 302

(51) Int. Cl.
*H04B 14/00* (2006.01)

(52) U.S. Cl. .............. 340/999; 340/457; 340/438; 701/29; 701/30; 458/415; 458/575.9

(58) Field of Classification Search .............. 340/426.6, 340/438, 445, 539.24, 457; 701/29, 30, 31; 455/418, 419, 569.2, 575.9, 41.2
See application file for complete search history.

(56) References Cited

U.S. PATENT DOCUMENTS

| | | | |
|---|---|---|---|
| 5,838,251 A | 11/1998 | Brinkmeyer et al. | |
| 6,253,129 B1 * | 6/2001 | Jenkins et al. | 701/29 |
| 6,282,491 B1 * | 8/2001 | Bochmann et al. | 701/209 |
| 6,359,570 B1 * | 3/2002 | Adcox et al. | 340/902 |
| 6,745,153 B2 * | 6/2004 | White et al. | 702/184 |
| 6,766,233 B2 * | 7/2004 | Odinak et al. | 701/36 |
| 7,003,320 B2 * | 2/2006 | Müller | 455/558 |
| 2002/0022979 A1 * | 2/2002 | Whipp et al. | 705/5 |
| 2002/0156558 A1 * | 10/2002 | Hanson et al. | 701/33 |
| 2003/0093199 A1 * | 5/2003 | Mavreas | 701/33 |

FOREIGN PATENT DOCUMENTS

DE 198 16 575 A1 1/1999

(Continued)

*Primary Examiner*—Jeff Hofsass
*Assistant Examiner*—Edny Labbees
(74) *Attorney, Agent, or Firm*—Crowell & Moring LLP

(57) ABSTRACT

A telematics service in a motor vehicle is provided by a mobile radio link between a telematics controller in the motor vehicle and an external telematics center. The telematics center is provided with data which identifies the motor vehicle from a first database and with data which identifies the mobile radio link from a second database. The the telematics center uses the data that has been provided to produce the authorization automatically.

15 Claims, 2 Drawing Sheets

FOREIGN PATENT DOCUMENTS

| | | |
|---|---|---|
| DE | 197 52 970 | 6/1999 |
| DE | 100 33 808 A1 | 1/2002 |
| EP | 0 891 111 A2 | 1/1999 |
| EP | 1 173 036 A1 | 1/2002 |
| JP | 06 006 852 A | 1/1994 |

* cited by examiner

METHOD FOR AUTHORISATION IN A TELEMATIC CENTRE USING TWO DATABASES CONTAINING DATA CHARACTERISING THE MOTOR VEHICLE OR A MOBILE RADIO CONNECTION

BACKGROUND AND SUMMARY OF THE INVENTION

This application claims the priority of German patent document 102 58 302.1, filed Dec. 13, 2002 (PCT International Application No. PCT/EP2003/012685, filed Nov. 13, 2003), the disclosure of which is expressly incorporated by reference herein.

The invention relates to a method for authorization of a telematics service in a motor vehicle. Such a telematics service is provided by a module radio link between a telematics controller in the motor vehicle and a telematics center arranged outside the motor vehicle. The telematics controller also has a communication means, which at least at times, can be connected wirelessly to a further communication means, which is arranged in the telematics center. This link allows data to be transmitted and/or received by the motor vehicle.

Modern motor vehicles are frequently equipped with telematics services, which assist the driver in critical situations, increase driving convenience or reduce the fuel consumption (thereby reducing environmental pollution). Examples are an emergency call function, remote diagnosis services, and dynamic navigation (routing).

Before the driver can use such telematics services in the motor vehicle, a once-off authorization process must be carried out, to check whether (and if so, which) telematics services the motor vehicle and/or its driver can or may use. This authorization process is carried out, for example, by the telematics center. During the authorization process, data which relates in particular to the motor vehicle and/or the mobile radio link is evaluated. The telematics services cannot be used in the motor vehicle until the authorization process ("enabling") has been successfully completed.

Methods for authorization of a communication means in a communication network are already known in differing forms. For example, German patent document DE 197 52 970 A1 describes a method in which the communication means sets up a link to a control station for the communication network, and transmits the information that is required for authorization of the communication means. The authorization process can thus be carried out completely from the communication means. However, this method requires that a corresponding link be produced in the communication network. Furthermore, the required information must be provided to the communication means, before it can be used.

German patent document DE 198 16 575 discloses a method for authorization of a telematics service in a motor vehicle. The telematics service is provided using a specific, further-developed SIM card ("Subscriber Identity Module"). This specific card is first of all provided with a telephone number for the telematics center. The user then initiates an authorization process by making a request to the telematics center, for example in the form of a short message (SMS, "Short Message Service"). Together with the request, the user of the card and/or of the associated motor vehicle sends information to the telematics center. In particular, the telephone number of the card (that is, the associated motor vehicle) is provided for the telematics center. The telematics center checks this information and in turn produces an authorization by transmission of data (for example once again in the form of a short message). The data which is transmitted by the telematics center includes, in particular, specific electronic keys for use of the telematics service. The driver of the motor vehicle must therefore either himself initiate the authorization process, or must look for a workshop. In any case, the telematics service cannot be used immediately, ex-works. It is also once again necessary to set up an appropriate link in the communication network.

One object of the invention is to provide a low-cost simple method for authorization of a telematics service in a motor vehicle, which allows use of the telematics service ex-works and does not require a corresponding link to be set up in the communication network.

This and other objects and advantages are achieved by the method in which the telematics center is provided with data which identifies the motor vehicle from a first database and with data which identifies the mobile radio link from a second database. The telematics center then uses the data that has been provided to produce the authorization automatically.

This method also has a number of advantages. For example, the telematics center links the data which identifies the motor vehicle to the data which identifies the mobile radio link as part of the authorization process. Thus, in particular, the telephone number of the associated motor vehicle in the mobile radio network is known in the telematics center after successful authorization ("enabling"), which allows the telematics service to be used ex-works. The motor vehicle therefore does not need to be authorized in a workshop before being delivered to the customer. This is particularly worthwhile for vehicle-related telematics services, such as remote diagnosis. The motor vehicle is thus complete on leaving the production works (that is, includes the telematics services that are associated with that motor vehicle). There is no need for time-consuming and costly reworking by the dealer or in a workshop.

Furthermore, this avoids the complex and expensive process, which is susceptible to errors, of initially setting up a corresponding mobile radio link between the telematics controller and the telematics center. This interchange of data for the first time results in particular in providing the telematics center with the telephone number of the telematics controller in the motor vehicle, which is stored in some suitable form. For this purpose, the vehicle must be ready to receive, at least for the duration of the authorization process. Furthermore, the individual processing and the data interchange incur corresponding costs. In addition, such radio link initialization processing is particularly susceptible to errors.

A further advantage is the reliability and security that the invention offers. Use of suitably protected databases and data transmission paths allows an authorization process which is particularly resistant to manipulation, robust and reliable. An additional advantage is evident in the situation in which telematics control in the motor vehicle is also designed to be resistant to manipulation, in a corresponding manner. In this situation, it may even be possible to dispense with the storage of electronic keys for the telematics service in the telematics controller.

Furthermore, the telephone number of the motor vehicle (that is, the telephone number of the associated telematics controller) is already known at an early stage in the telematics center. For example, the telephone number can be made available in the telematics center even at the start of production of the motor vehicle. This allows appropriate preparations to be taken in the telematics center at this stage.

According to the invention, there is no need to store a telephone number of the telematics center in the telematics controller in the motor vehicle. This is because the telematics center in fact "knows" the telephone number of the telematics controller in the motor vehicle after enabling and can, for example, appropriately monitor whether this telephone number has been registered in the mobile radio network. On registration, the telematics center could then send its own appropriate telephone number to the telematics controller.

This procedure is expedient, for example, in the situation where a number of telematics centers are provided, or the telephone number of a telematics center has not yet been defined.

According to the invention, any desired mobile radio networks may be provided, such as a GSM network ("Global System for Mobile Communication")—also in the form of a GPRS ("General Packet Radio System")—a UMTS network ("Universal Mobile Telephone System") or a satellite-based network. The invention is, of course, not restricted to the use of a single network. For example, it is possible to provide for the simultaneous or alternate use of two or more mobile radio networks in the telematics controller, for transmission and/or reception of data. Furthermore, a combination with other communication means, for example for a WLAN ("Wide Local Area Network") is also possible.

The telematics controller itself may either be in the form of a unit or may be formed from various distributed components which are connected, for example, via a local area network (CAN bus, "Controlled Area Network").

A large number of options are provided for making the data from the first and second databases available in the telematics center. For example, a wire-based link, in digital form, such as an ISDN link, a wireless link such as mobile radio or satellite, and directional radio are possible. In this case, the telematics center is not necessarily provided at a single location. For example, the telematics center may be in the form of a number of distributed computers ("server").

In one advantageous refinement, at least one telephone number of the telematics center is stored in the telematics controller, so that the vehicle is fully functional, in an ideal manner, ex-works.

It is particularly advantageous for the telematics controller to hold a subscriber card for setting up the mobile radio link. One such subscriber card is the SIM card ("Subscriber Identity Module") for a GSM network. Subscriber cards such as these allow the telematics controller in the motor vehicle to be separated into a vehicle-specific part ("hardware") and a mass-produced article (that is, the subscriber card). This advantageously makes it possible to exploit the cost and selection advantages of a mass-produced article. A subscriber card is thus fitted in the motor vehicle with each telematics controller. In this case, for example, it is possible to provide for the subscriber card to be permanently integrated in the telematics controller. This is advantageous from the security and reliability points of view, and emphasizes the fact that the telematics service or services is or are an integrated component of the motor vehicle.

The use of a subscriber card results in a further use in a manner that is specific to the invention, because the subscriber card is offered in a simple form by suppliers such as operators or service providers of mobile radio networks. These suppliers also conveniently already store data which identifies the mobile radio link. There is therefore no need to set up a second database for authorization of the telematics service according to the invention. In fact, already existing databases can be used, without any problem.

It is advantageous that the data provided to the telematics center from the second database comprises at least the subscriber card identification number and the telephone number of the subscriber card that is held by the telematics controller. This identification number (ICC-ID, "IC-Card Identification" or IMSI "International Mobile Subscriber Identity") is stored in the subscriber card during production, and is unique throughout the world to each subscriber card. The subscriber cards—identification number and the telephone number of a subscriber card—are provided by the supplier, together with the subscriber card. This ensures, in a particularly simple way, unique identification of those features which identify the mobile radio link in the subscriber card that is installed in the motor vehicle, and thus the motor vehicle itself.

Every vehicle production works has a vehicle documentation database, in which data relating to the motor vehicles produced is stored. For example, each motor vehicle is allocated a chassis number that is stored in the database. This chassis number is used for unique identification of the motor vehicle. In one particularly simple embodiment of the invention, therefore, the data provided to the telematics center from the first database comprises at least the chassis number (which identifies the motor vehicle) and the subscriber card identification number for the subscriber card which is held by the telematics controller. For this purpose, the already existing vehicle documentation database for each motor vehicle need have one further entry added to it, specifically the subscriber card identification number for the subscriber card which is held by the telematics controller. This ensures unique identification of the features which identify the motor vehicle, in a particularly simple manner.

It is particularly advantageous to permanently store an access code (PIN, "Personal Identification Number"), which is required for use of the subscriber card, in the telematics controller. This prevents removal and misuse of the subscriber card.

The telematics service is essentially convenient if it is personalized by provision of the data which identifies the respective subscriber in more detail in the telematics center, such as the name, address and vehicle identification of the subscriber, which allows individual supervision of the subscriber to the telematics service. This data is, for example, provided by the dealer who is selling the vehicle with the telematics service to the subscriber.

Other objects, advantages and novel features of the present invention will become apparent from the following detailed description of the invention when considered in conjunction with the accompanying drawings.

DETAILED DESCRIPTION OF THE DRAWINGS

Figure 1:
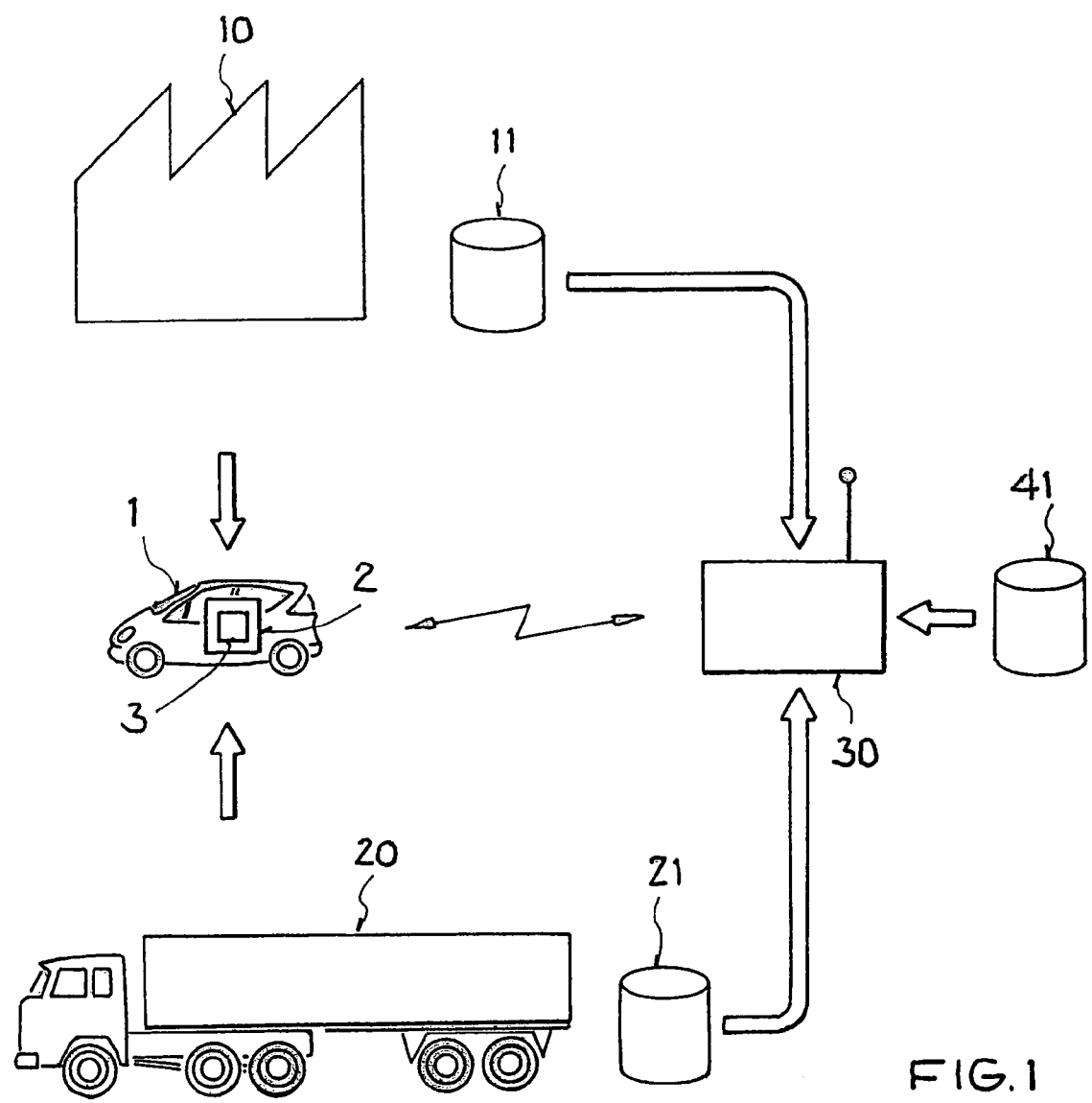
FIGS. 1 and 2 are schematic illustrations of first and second preferred embodiments of the invention.

FIG. 1 shows a motor vehicle 1 with a telematics controller 2 having a subscriber card 3 for a mobile radio network. The motor vehicle 1 is produced by a vehicle production works 10. A supplier 20 supplies the subscriber card 3 for the mobile radio network together with the access code (PIN, "Personal Identification Number"), which is required for use of the subscriber card 3. The telematics controller 2 is installed in the vehicle 1 in the vehicle production works 10. The subscriber card 3 is likewise installed in the telematics controller 2 in the vehicle production works 10. Furthermore, the subscriber card 3 is enabled by the PIN in the vehicle production works 10, with the PIN being permanently stored in the telematics controller 2.

Figure 2:
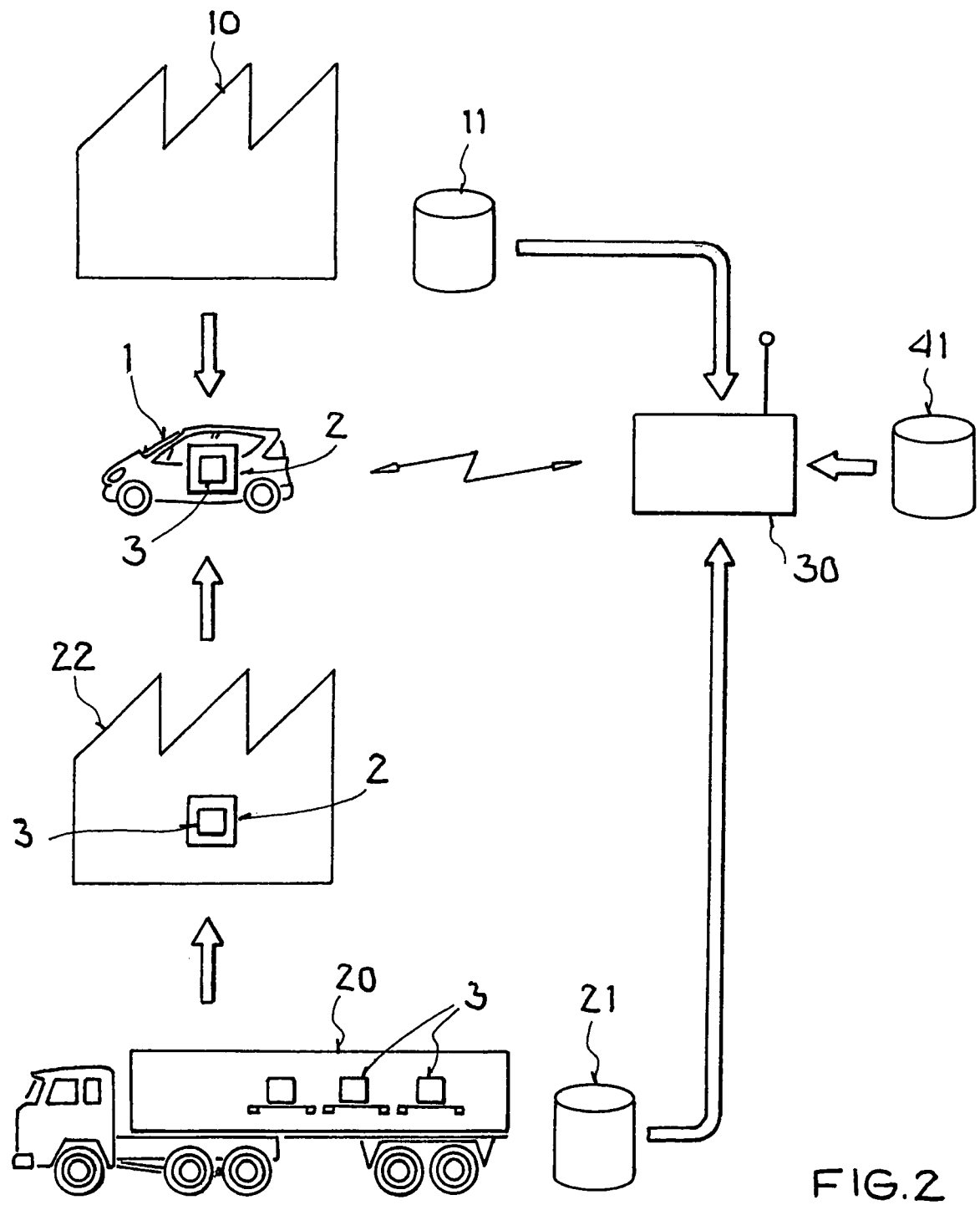

In FIG. 2, the supplier 20 supplies the subscriber card 3 for the mobile radio network together with the access code (PIN, "Personal Identification Number") that is required for use of the subscriber card 3, to a supplier 22, who installs it in the telematics controller 2. The supplier 22 then enables the subscriber card 3 by means of the PIN, with the PIN being permanently stored in the telematics controller 2. The enabled telematics controller 2 is supplied by the supplier 22 to the vehicle production works 10. The enabled telematics controller 2 is installed in the vehicle 1 in the vehicle production works 10.

The further details apply in the same sense both to FIG. 1 and to FIG. 2. For this reason, no further distinction will be drawn in the following text between FIG. 1 and FIG. 2, and the reference symbols which are used in the statements are used in both FIG. 1 and FIG. 2.

Since the PIN is permanently stored in the telematics controller 2, removal and misuse of the subscriber card 3, are prevented. Furthermore, the telematics service is immediately functional ("unpersonalized telematics service").

The vehicle production works 10 and the supplier 20 each have a respective database 11 and 21. The subscriber card identification number of the subscriber card 3 held by the telematics controller 2 is stored in the vehicle documentation database 11, in addition to the chassis number which uniquely identifies the motor vehicle 1. At least the subscriber card identification number and the telephone number of the subscriber card 3 which has been delivered to the vehicle production works 10 and is held in the telematics controller 2 are stored in the supplier's database 21.

At the start of production, the scope of the telematics service to be authorized in the motor vehicle 1 is defined. Once the motor vehicle 1 has been produced, this telematics service is provided by a mobile radio link between the telematics controller 2 and an external telematics center 30.

The telematics center 30 is then provided from the vehicle documentation database 11 with the chassis number, which uniquely identifies the motor vehicle 1, the subscriber card identification number of the subscriber card 3 which is to be installed in the telematics controller 2, and information about the scope of the telematics service to be authorized in the motor vehicle 1, via an ISDN line. The subscriber card identification number and the telephone number of the subscriber card 3 supplied to the vehicle production works 10 and to be installed in the telematics controller 2 there are provided via an ISDN line from the supplier's database 21.

The dealer who is selling or leasing the vehicle 1 with the telematics service provides the telematics center with data from a database 41 identifying the keeper of the vehicle 1 in more detail. This data, for example the name, address and vehicle identification of the customer, is normally created when the vehicle 1 is handed over to the dealer's customer. This data, which allows individual supervision of a subscriber to the telematics service, is already available in any case, without any additional effort, and is transferred from the dealer's database 41 via an ISDN line to the telematics center 30.

The data which is provided from the dealer's database 41 results in a particularly convenient "personalized telematics service". However, the telematics service is fully functional as a "non-personalized telematics service" even without the data provided from the database 41. For example, an "emergency call" telematics service is provided as a "personalized telematics service" with a message in the form "Herr Meier in his S500 with the vehicle license number S-MB 500 at the location X has initiated an emergency call". As a "non-personalized telematics service", the emergency call is made with a message in the form "S500 vehicle at the location X has initiated an emergency call". If the subscriber changes, for example when the vehicle 1 is sold, the data provided from the database 41 in the telematics center 30 is deleted, thus resulting once again in an "unpersonalized telematics service", until the telematics center 30 has been provided with new customer data.

After reception of the data that has been provided, the automated authorization process starts in the telematics center 30. During this process, a billing account for the telematics service is opened up, for example, in a manner known per se. During this process, the billing account is associated with the vehicle 1. This avoids complex creditworthiness checks, since the vehicle manufacturer represents a solvent contract partner. The telematics service is thus fully functional on completion of the motor vehicle 1 in the vehicle production works 10.

For the customer who is procuring the motor vehicle 1, there is therefore no need for the closure and, if required, extension of a mobile radio contract and an additional contract with the telematics service provider. He procures the motor vehicle 1 with the telematics service as a fully functional, integral component. Even when the customer sells the motor vehicle 1 for the first time, the telematics service remains fully operational.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for authorizing, in a motor vehicle, provision of a telematics service to said vehicle via a mobile radio link between a telematics controller in the motor vehicle and an external telematics center, said telematics controller being provided to said vehicle by a first source, and said mobile radio link being provided to said telematics controller by a second source that is different from said first source, wherein said method comprises:
   said first source providing the telematics center with first data from a first database maintained by said first source, which first data includes an identification of the motor vehicle;
   said second source providing the telematics center with second data from a second database maintained by said second source, which second data identifies the mobile radio link; and
   the telematics center associating the data that identifies the motor vehicle with the data that identifies the mobile radio link, and automatically authorizing the provision of telematics service to said vehicle via said mobile radio link.

2. The method according to claim 1, wherein:
   said first database is maintained by a vehicle manufacturer; and
   said second database is maintained, separate from said first database, by a supplier of a subscriber card that is installed in the telematics controller.

3. The method for authorization as claimed in claim 1, wherein at least one telephone number of the telematics center is stored in the telematics controller.

4. The method for authorization as claimed in claim 3, wherein the telematics controller has a subscriber card for transmitting data via the mobile radio link.

5. The method for authorization as claimed in claim 4, wherein the subscriber card is in the form of a SIM card for a GSM network.

6. The method for authorization as claimed in claim 5, wherein the first database is in the form of a vehicle documentation database.

7. The method for authorization as claimed in claim 1, wherein the first data includes a chassis number which identifies the motor vehicle and a subscriber card identification number for the subscriber card which is held by the telematics controller.

8. The method for authorization as claimed in claim 7, wherein:
   the second data includes at least the subscriber card identification number and a telephone number of the subscriber card which is held by the telematics controller; and
   the telematics center associates the motor vehicle with the communications link based on the subscriber card identification number.

9. The method for authorization as claimed in claim 8, wherein an access code, which is required for use of the subscriber card, is permanently stored in the telematics controller.

10. The method for authorization as claimed in claim 9, wherein the telematics service is personalized by subscriber data that is provided in the telematics center.

11. A method for authorizing the provision, via a mobile communications link, of telematic services from an external telematics center to a vehicle having a telematics controller that is provided to said vehicle by a first source and is accessible via said mobile communications link, which mobile communications link is provided to the telematics controller by a second source, said method comprising:
   said first source providing said telematics center with first data that includes an identification of the vehicle in which the telematics controller is installed, as well as a subscriber identification number for said telematics controller;
   said second source providing said telematics center with second data which identifies, and enables access to, said mobile communications link, and which includes the subscriber identification number; and
   said telematics center using the first and second data to enable, automatically and without need of action by a user of the vehicle, the provision of telematic services to the vehicle via the mobile communications link.

12. The method according to claim 11, wherein said step of using the first and second data to automatically enable the provision of telematic services to the vehicle comprises:
   said telematics center associating the mobile communications link with the vehicle, based on the subscriber identification number provided by the first and second sources; and
   said telematics center using said data that identifies the mobile communications link to enable the provision of telematic services to the vehicle via the mobile communications link.

13. The method according to claim 11, wherein said data that identifies said mobile communications link comprises a telephone number.

14. The method according to claim 1, wherein:
   said telematics center associates the mobile radio link with the vehicle based on said subscriber identification number that is included in both said first and second data; and
   said telematics center uses said mobile radio link to enable the provision of said telematics service to the vehicle via the mobile radio link.

15. The method according to claim 11, wherein said data that identifies said mobile radio link comprises a telephone number.

* * * * *